United States Patent
Furihata et al.

(10) Patent No.: US 11,392,136 B2
(45) Date of Patent: Jul. 19, 2022

(54) AUTOMATED GUIDED VEHICLE SYSTEM AND OWN-POSITION ESTIMATION METHOD FOR AUTOMATED GUIDED VEHICLE

(71) Applicant: Seiko Epson Corporation, Tokyo (JP)

(72) Inventors: Ikuma Furihata, Matsumoto (JP); Kento Okumura, Markham (CA); Yasushi Nakaoka, Shiojiri (JP); Hiroyuki Kanai, Shiojiri (JP)

(73) Assignee: Seiko Epson Corporation

( * ) Notice: Subject to any disclaimer, the term of this patent is extended or adjusted under 35 U.S.C. 154(b) by 243 days.

(21) Appl. No.: 16/796,979

(22) Filed: Feb. 21, 2020

(65) Prior Publication Data

US 2020/0272167 A1   Aug. 27, 2020

(30) Foreign Application Priority Data

Feb. 22, 2019   (JP) .............................. JP2019-030483

(51) Int. Cl.
*G05D 1/02* (2020.01)
*G01C 21/20* (2006.01)
(Continued)

(52) U.S. Cl.
CPC ........... *G05D 1/0268* (2013.01); *G01C 19/00* (2013.01); *G01C 21/206* (2013.01); *G01S 17/06* (2013.01); *G05D 1/0231* (2013.01)

(58) Field of Classification Search
CPC .. G01C 19/00; G01C 21/1652; G01C 21/206; G01S 17/06; G05D 1/0231;
(Continued)

(56) References Cited

U.S. PATENT DOCUMENTS 8,634,958 B1 *   1/2014   Chiappetta .............. H02J 50/10
                                                        700/245
10,303,179 B2 *   5/2019   Shin ....................... B25J 19/021
(Continued)

FOREIGN PATENT DOCUMENTS

CA   2822980 A1 *   7/2012   ........... G05D 1/0038
EP   2186610 A1 *   5/2010   ........... G01S 7/0232
(Continued)

*Primary Examiner* — Babar Sarwar
(74) *Attorney, Agent, or Firm* — Harness, Dickey & Pierce, P.L.C.

(57) ABSTRACT

An automated guided vehicle system in which an automated guided vehicle autonomously moves inside a building is provided. The automated guided vehicle includes: an internal sensor having an encoder and a gyro sensor and acquiring information about an own position; an external sensor casting light onto a reflection board arranged in the building, receiving reflected light from the reflection board, and acquiring information about an own position; and a control unit correcting the own position based on the internal sensor, based on the information acquired by the external sensor. The own position via the internal sensor has a margin of error such that the automated guided vehicle can travel for a predetermined period, using only the internal sensor. The control unit performs own-position correction via the external sensor, using one of the reflection boards.

10 Claims, 10 Drawing Sheets

(51) Int. Cl.
*G01C 19/00* (2013.01)
*G01S 17/06* (2006.01)

(58) Field of Classification Search
CPC .... G05D 1/0244; G05D 1/0268; G05D 1/027; G05D 1/0272; G05D 1/0274; G05D 2201/0216
See application file for complete search history.

(56) References Cited

U.S. PATENT DOCUMENTS

| | | | | |
|---|---|---|---|---|
| 10,444,343 | B2 * | 10/2019 | Kuo | G01S 13/74 |
| 10,965,099 | B2 * | 3/2021 | Kitano | G01S 17/93 |
| 2008/0024306 | A1 * | 1/2008 | Bomber | G06K 7/10881 |
| | | | | 340/572.7 |
| 2009/0082968 | A1 * | 3/2009 | Tanaka | B66F 9/0755 |
| | | | | 701/300 |
| 2010/0049391 | A1 * | 2/2010 | Nakano | G05D 1/027 |
| | | | | 701/23 |
| 2013/0103200 | A1 * | 4/2013 | Tucker | G01C 21/20 |
| | | | | 700/275 |
| 2013/0325243 | A1 * | 12/2013 | Lipkowski | G01S 17/86 |
| | | | | 701/25 |
| 2016/0299508 | A1 * | 10/2016 | Shin | G05D 1/0219 |
| 2017/0329336 | A1 * | 11/2017 | Li | G05D 1/0219 |
| 2018/0003792 | A1 * | 1/2018 | McCafferty | G05D 1/028 |
| 2018/0072212 | A1 * | 3/2018 | Alfaro | B60G 3/08 |
| 2018/0087909 | A1 * | 3/2018 | Do | G01S 5/0226 |
| 2018/0239357 | A1 * | 8/2018 | Kim | G01S 17/931 |
| 2019/0035099 | A1 * | 1/2019 | Ebrahimi Afrouzi | |
| | | | | G06T 7/0002 |
| 2020/0050206 | A1 * | 2/2020 | Deyle | G01S 13/74 |
| 2020/0356102 | A1 * | 11/2020 | Morse | G05D 1/0219 |
| 2021/0165421 | A1 * | 6/2021 | Ko | A01D 34/008 |

FOREIGN PATENT DOCUMENTS

| | | | | | |
|---|---|---|---|---|---|
| EP | 2801840 | B1 | * | 8/2016 | ......... G01C 21/3602 |
| EP | 3278937 | A1 | * | 2/2018 | ........... G05D 1/0214 |
| GB | 2583698 | A | * | 11/2020 | ............ B60W 30/12 |
| JP | H11-183174 | A | | 7/1999 | |
| JP | 2000-099145 | A | | 4/2000 | |

* cited by examiner

AUTOMATED GUIDED VEHICLE SYSTEM AND OWN-POSITION ESTIMATION METHOD FOR AUTOMATED GUIDED VEHICLE

The present application is based on, and claims priority from, JP Application Serial Number 2019-030483, filed Feb. 22, 2019, the disclosure of which is hereby incorporated by reference herein in its entirety.

BACKGROUND

1. Technical Field

The present disclosure relates to an automated guided vehicle system in which an automated guided vehicle autonomously moves inside a building, and an own-position estimation method for an automated guided vehicle.

2. Related Art

A system in which a plurality of reflection boards are arranged along a traveling path inside a building, a laser rangefinder (LRF) installed in an automated guided vehicle (AGV) detects the reflection boards, and the AGV calculates its own position, is known.

JP-A-2000-99145 and JP-A-11-183174 describe that the AGV calculates its own position by using two or more reflection boards.

However, in the configuration where the AGV calculates its own position by using two or more reflection boards as in the related art, the LRF needs to be able to constantly detect the plurality of reflection boards while the AGV is moving.

Therefore, a large number of reflection boards are arranged along the traveling path inside the building in order to secure the detection. However, it is not easy to secure places to install the large number of reflection boards inside the building. Also, using the large number of reflection boards increases the load of arithmetic processing of detection results for the AGV to calculate its own position.

As disclosed in JP-A-2000-99145 and the JP-A-11-183174, when a pole-like component is arranged to stand upward at an upper part of the AGV and the LRF is installed at the tip of the pole-like component, the field of vision of the LRF is less likely to be obstructed. Thus, the number of reflection boards can be reduced. However, attaching the pole-like component limits the space where goods can be placed at the top side of the AGV. Also, it increases the size of the AGV itself and also increases the risk of the pole-like component and the LRF colliding with an object placed inside the building and therefore increases the risk of damage.

In short, the configuration where the AGV calculates its own position by using two or more reflection boards as in the related art has various problems as described above and is therefore hard to put into practical use.

SUMMARY

An aspect of the present disclosure is directed to an automated guided vehicle system in which an automated guided vehicle autonomously moves inside a building, and the automated guided vehicle includes: an internal sensor having an encoder and a gyro sensor and acquiring information about an own position; an external sensor casting light onto a reflection board arranged in the building, receiving reflected light from the reflection board, and acquiring information about an own position; and a control unit correcting the own position based on the internal sensor, based on the information acquired by the external sensor. The own position via the internal sensor has a margin of error of less than ±1% with respect to 10-m travel. The control unit performs own-position correction via the external sensor, using one of the reflection boards.

DESCRIPTION OF EXEMPLARY EMBODIMENTS

Figure 1:
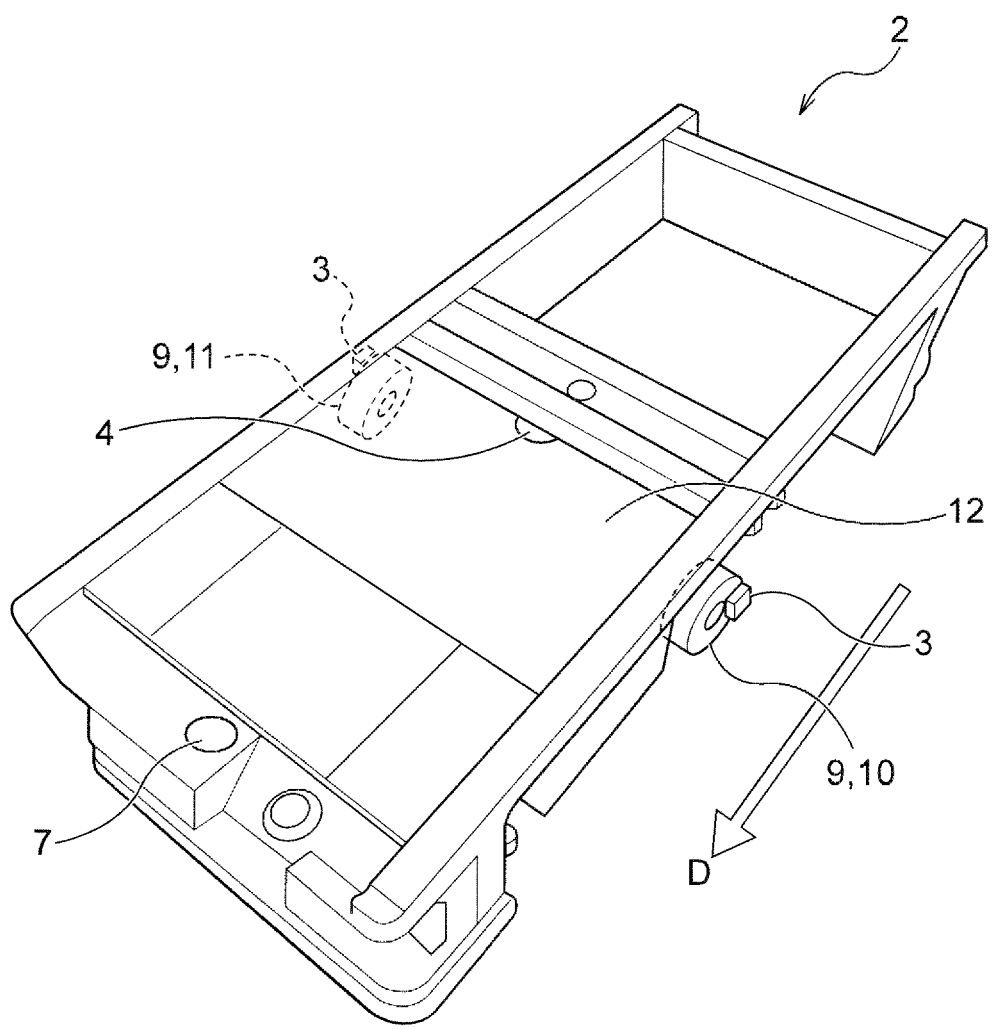
FIG. 1 is a perspective view showing an automated guided vehicle according to Embodiment 1 of the present disclosure, as viewed from the front side.

First, an outline of the present disclosure will be described.

An automated guided vehicle system according to a first aspect of the present disclosure in order to solve the foregoing problems is an automated guided vehicle system in which an automated guided vehicle autonomously moves inside a building. The automated guided vehicle includes: an internal sensor having an encoder and a gyro sensor and acquiring information about an own position; an external sensor casting light onto a reflection board arranged in the building, receiving reflected light from the reflection board, and acquiring information about an own position; and a control unit correcting the own position based on the internal sensor, based on the information acquired by the external sensor. The own position via the internal sensor has a margin of error of less than ±1% with respect to 10-m travel. The control unit performs own-position correction via the external sensor, using one of the reflection boards.

According to this aspect, since the margin of error in the own position via the internal sensor is less than ±1% with respect to 10-m travel, the margin of error in the own position via the internal sensor allows an accuracy that causes no problem to traveling for a predetermined period. That is, according to the present disclosure, a high traveling accuracy of the AGV is achieved based on own-position correction via the internal sensor. Thus, the control unit can perform own-position correction via the external sensor, using one of the reflection boards.

The combination of the internal sensor and the external according to this aspect enables sufficient own-position correction using one reflection board. It is also advantageous in that the correction need not be carried out frequently. Also, since one reflection board is sufficient, the load of arithmetic processing of the detection result is smaller and the number of reflection boards installed inside the building can be reduced. Thus, the cost of equipment installation can be restrained.

Thus, the problems occurring in the configuration where the own position is calculated using two or more reflection boards as in the related art can be reduced. This facilitates practical use of the automated guided vehicle system where the automated guided vehicle autonomously moves.

According to a second aspect of the present disclosure, an own-position estimation method for an automated guided vehicle moving autonomously inside a building includes: a first step of acquiring first position information of the automated guided vehicle from an internal sensor having an encoder and a gyro sensor; a second step of casting light from the automated guided vehicle onto a reflection board arranged in the building and acquiring second position information of the automated guided vehicle in relation to the reflection board from an external sensor receiving reflected light from the reflection board; a third step of extracting map position information of a plurality of on-map reflection boards on a map of an inside of the building that is registered in advance; a comparison step of comparing the second position information of the automated guided vehicle acquired in the second step and the map position information of the on-map reflection boards extracted in the third step, and specifying the on-map reflection board corresponding to the reflection board; and a correction step of correcting the first position information, using computed position information of the automated guided vehicle computed based on the on-map reflection board specified in the comparison step. In the comparison step, one or more of the plurality of on-map reflection boards in the third step, included in a first predetermined range from a center position of the reflection board in the second step, are specified.

According to this aspect, in the comparison step, one or more of the plurality of on-map reflection boards in the third step, included in a first predetermined range from the center position of the reflection board in the second step, are specified. This enables own-position estimation that achieves effects similar to those of the first aspect.

According to a third aspect of the present disclosure, in the second aspect, the first step includes acquiring the first position information of the automated guided vehicle from an internal sensor having a margin of error in the own position of less than ±1% with respect to 10-m travel.

According to this aspect, the first position information is acquired from an internal sensor having a margin of error in the own position of less than ±1% with respect to 10-m travel or satisfying this margin of error. Therefore, a high traveling accuracy of the AGV is achieved based on own-position correction via the internal sensor. Thus, the second position information in relation to the reflection board arranged inside the building can be acquired by the external sensor, using one of the reflection boards, and proper own-position estimation can be easily carried out, using one reflection board.

According to a fourth aspect of the present disclosure, in the second aspect or the third aspect, after the correction step is executed over the first predetermined range and the automated guided vehicle makes a course correction and moves on, the first predetermined range is changed into a second predetermined range smaller than the first predetermined range and each step similar to the above is executed. Here, the term "each step" refers to the first step, the second step, the third step, the comparison step, and the correction step.

According to this aspect, when the correction step is executed over the first predetermined range and the automated guided vehicle makes a course correction, an improved accuracy of own-position is achieved. Thus, the first predetermined range can be changed into the second predetermined range smaller than the first predetermined range.

Therefore, when detecting reflection boards in the second step and specifying, in the comparison step, one or more of the on-map reflection boards corresponding to the reflection boards detected in the second step, the influence of a noise due to a glossy object around the reflection boards arranged inside the building can be restrained because the second predetermined range is smaller than the first predetermined range.

When the correction step is executed over the second predetermined range and the automated guided vehicle makes a course correction, a further improvement in the accuracy of own-position is achieved. Subsequently, the second predetermined range may be changed into a third predetermined range even smaller than the second predetermined range.

According to a fifth aspect of the present disclosure, in the fourth aspect, in the comparison step, when none of the plurality of on-map reflection boards in the third step is included in a second predetermined range or a third predetermined range from the center position of the reflection board in the second step, the second predetermined range or the third predetermined range is changed into the first predetermined range.

When an unexpected course deviation or the like occurs after the automated guided vehicle makes a course correction via the correction step executed over the first predetermined range, it may be the case that none of the plurality of on-map reflection boards in the third step is included in the second predetermined range or the third predetermined range.

According to this aspect, in such a case, the second predetermined range or the third predetermined range is changed into the original first predetermined range. Therefore, the reflection board can be detected more easily and the automated guided vehicle can be more easily restored into the state of being able to perform own-position correction.

According to a sixth aspect of the present disclosure, in the fourth aspect or the fifth aspect, the first predetermined range has a radius of 3 m or less from the center position of the reflection board in the second step.

According to this aspect, the first predetermined range has a radius of 3 m or less from the center position of the reflection board in the second step. Therefore, the second position information of the automated guided vehicle in relation to the reflection board can be more easily acquired via the external sensor, even in the state where the accuracy of own-position estimation is low at the time of startup of the automated guided vehicle or the like. Thus, in the comparison step, one or more of the plurality of on-map reflection boards in the third step, included in the first predetermined range from the center position of the reflection board in the second step, can be specified more easily.

According to a seventh aspect of the present disclosure, in one of the fourth to sixth aspects, a plurality of distances from the automated guided vehicle to the reflection board in the second step are acquired, and the second predetermined range is a range calculated based on a standard deviation calculated from an estimation error model in the first step and the second step. The error model refers to a distribution of the amount of margin of error in own-position estimation that can occur in the calculation of own-position estimation in the first step and the second step.

According to this aspect, since an optimal range without excess or deficiency is decided based on the estimation error mode, proper noise elimination can be carried out and the automated guided vehicle can continue moving for a long time in the own-position estimation state.

According to an eighth aspect of the present disclosure, in the seventh aspect, the second predetermined range is a range three times or more and six times and less than a standard deviation of a margin of error in own-position estimation that can be expected from the estimation error model.

According to a ninth aspect of the present disclosure, in one of the second to eighth aspects, the map is divided into predetermined unit sections with an index, and the on-map reflection board registered on the map is associated with the index. The comparison step includes specifying the on-map reflection board corresponding to the second position information of the reflection board, using the index.

According to this aspect, the map is divided into predetermined unit sections with an index, and the on-map reflection board registered on the map is associated with the index. In the comparison step, the on-map reflection board corresponding to the second position information of the reflection board is specified, using the index. Therefore, the time taken for the specifying can be reduced.

According to a tenth aspect of the present disclosure, in the ninth aspect, in the comparison step, when two or more on-map reflection boards are detected within the first predetermined range from the center position of the reflection board in the second step, an on-map reflection board with a shortest distance from the reflection board is determined as a reflection board corresponding to the reflection board.

When arranging a plurality of reflection boards 6, depending on the structure inside the building, there may be a case where a large space cannot be taken between the neighboring reflection boards and where the reflection boards must be arranged at a small space between them. Depending on the degree of the small space, an on-map reflection board 22 may be located in sections of neighboring indices, of the sections divided with indices.

According to this aspect, when two or more on-map reflection boards are detected within the first predetermined range from the center position of the reflection board in the second step, the on-map reflection board with the shortest distance from the reflection board is determined as a reflection board corresponding to the reflection board. Thus, one of the on-map reflection boards can be specified easily even when the reflection boards are arranged with a small space between them.

According to an eleventh aspect of the present disclosure, in one of the second to tenth aspects, the reflection board has no recognition part.

According to this aspect, the reflection board has no recognition part. That is, the reflection board has only the function of reflecting light and has no recognition part such as a marker representing its own information. According to this aspect, such a reflection board can achieve the effect of each of the foregoing aspects.

According to a twelfth aspect of the present disclosure, in one of the second to eleventh aspects, the second step includes tilt information of the reflection board and includes deciding whether or not to use position information of the reflection board estimated based on the tilt information of the reflection board, for calculation of own-position estimation.

According to this aspect, a normal direction to the reflection board is estimated, based on the reflected light from the reflection board, and the normal direction whose angle difference from the angle of incidence of the cast light exceeds a threshold, that is, a limit angle value, is recognized as a noise. Adding such noise determination processing that focuses on the detected tilt of the reflection board enables more precise determination of the reflection board and therefore enables the automated guided vehicle to continue moving for a long time in the state of own-position estimation with high accuracy.

An automated guided vehicle system and an own-position estimation method for an automated guided vehicle according to Embodiment 1 of the present disclosure will now be described with reference to FIGS. 1 to 10. In the respective drawings, the same part is denoted by the same reference sign and is not described repeatedly with reference to each drawing.

Embodiment 1

Automated Guided Vehicle and Automated Guided Vehicle System

The configuration of an automated guided vehicle system 1 according to Embodiment 1 will now be described with reference to FIGS. 1 and 2. The automated guided vehicle system 1 is a system where an automated guided vehicle (AGV) 2 autonomously moves inside a building such as a plant.

The automated guided vehicle 2 includes: an internal sensor 5 having an encoder 3 and a gyro sensor 4 and acquiring information about an own position; an external sensor 7 such as a laser rangefinder (LRF) casting light onto a plurality of reflection boards 6 arranged in the building, receiving reflected light from the reflection boards 6, and acquiring information about an own position; and a control unit 8 correcting the own position based on the internal sensor 5, based on the information acquired by the external sensor 7.

Here, the term "board" of the "reflection board 6" is used because a board-like reflector is often used. However, the reflector is not limited to a board-like form. In this specification, the reflection board 6 is used as having the same meaning as a reflector that is not limited to a board-like form.

Figure 2:
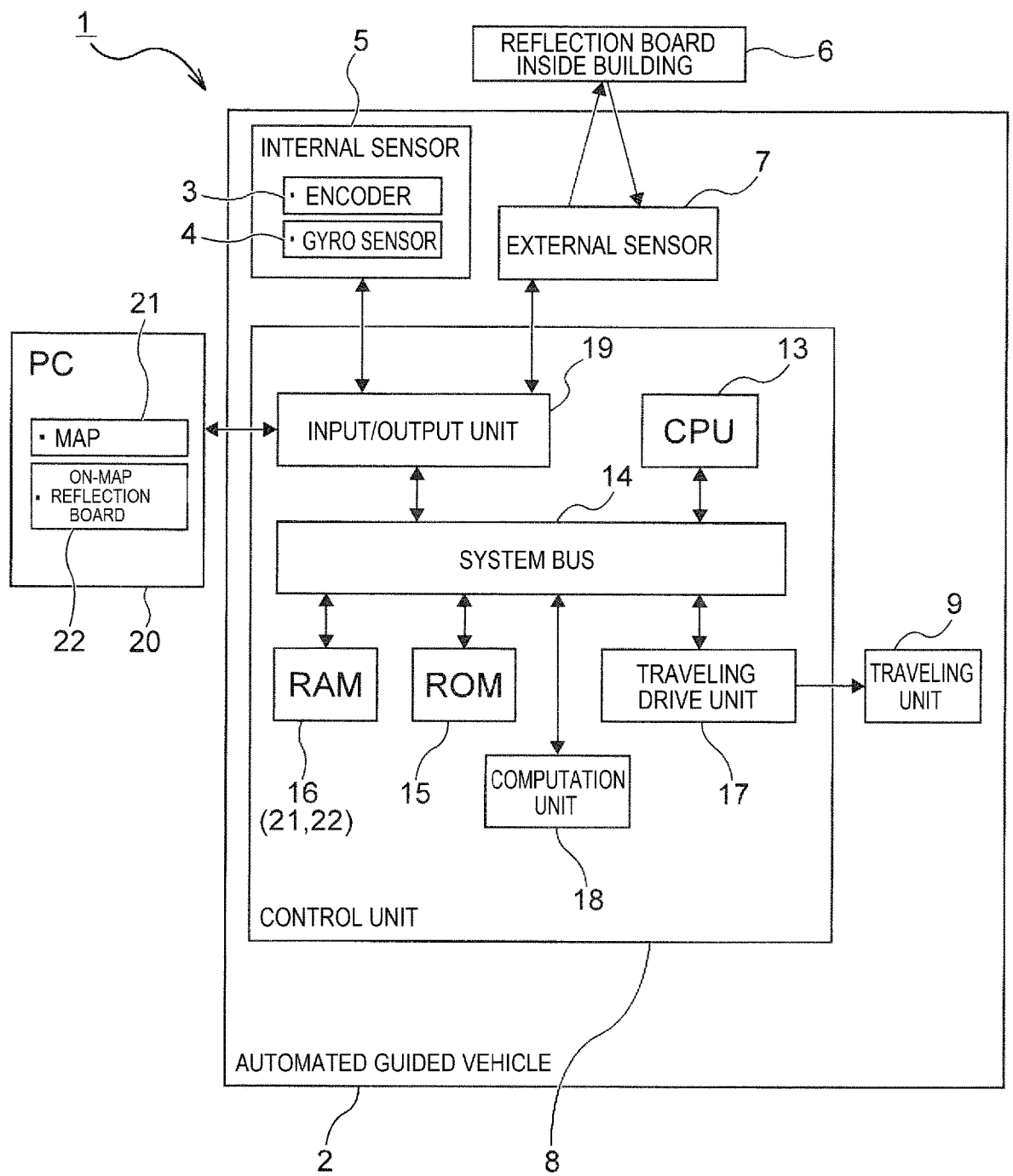
FIG. 2 is a block diagram of an automated guided vehicle system according to Embodiment 1.

The encoder 3 of the internal sensor 5 is provided at each of left and right wheels 10, 11 forming a traveling unit 9 of the automated guided vehicle 2, as shown in FIG. 1. The gyro sensor 4 of the internal sensor 5 is arranged substantially at the center position of the automated guided vehicle 2. The encoder 3 measures the traveling distance of the automated guided vehicle 2. The gyro sensor 4 corrects the amount of movement of the left and right wheels 10, 11 by detecting a change in the angular velocity of the automated guided vehicle 2. That is, the gyro sensor 4 corrects the traveling distance of the automated guided vehicle 2 measured by the encoder 3, by detecting a change in the angular velocity of the automated guided vehicle 2.

As the internal sensor 5 in this embodiment, an internal sensor having a smaller margin of error in own-position correction and a higher traveling accuracy than the related-art sensor is employed. Specifically, the margin of error in the own position by the internal sensor is less than ±1% with respect to 10-m travel of the automated guided vehicle 2. That is, the margin of error in the own position by the internal sensor 5 allows an accuracy that causes no problem to traveling for a predetermined period.

Here, an inertial measurement unit (IMU) made by Seiko Epson Corporation is used as the gyro sensor 4 and thus achieves the high traveling accuracy.

The external sensor 7 is provided substantially at the center position along left-right directions in a front end part in a traveling direction D of the automated guided vehicle 2, as shown in FIG. 1. A top surface 12 of the automated guided vehicle 2 is substantially flat and is configured in such a way that the automated guided vehicle 2 can travel with goods, not illustrated, placed at the top surface 12. The external sensor 7 is installed in such a way that its height reaches substantially the same position as the top surface of the automated guided vehicle 2. This is different from the structure in which a pole-like component is provided to stand upward at an upper part of the AGV and where an LRF is installed at the tip of the pole-like component, as in the related art.

Electrical Configuration of Automated Guided Vehicle System

The electrical configuration of the automated guided vehicle system will now be described with reference to FIG. 2.

The control unit 8 has a CPU 13 controlling the entirety of the automated guided vehicle 2. The CPU 13 is coupled via a system bus 14 to a ROM 15 storing various control programs and arithmetic programs executed by the CPU 13. The CPU 13 is also coupled to a RAM 16 configured to be able to temporarily store data, and in this embodiment, storing data of a map 21 of the inside of the building and the position of an on-map reflection board 22, or the like. The CPU 13 is also coupled via the system bus 14 to a traveling drive unit 17 driving the wheels 10, 11 forming the traveling unit 9. The CPU 13 is also coupled via the system bus 14 to a computation unit 18 performing arithmetic processing or the like based on detection information from the external sensor 7.

The CPU 13 is also coupled to an input/output unit 19 via the system bus 14. The input/output unit 19 is configured to be able to be coupled to a PC 20, which is a computer to send and receive data of the map 21 of the inside of the building and the position of the on-map reflection board 22. The input/output unit 19 is also coupled to the internal sensor 5 and the external sensor 7.

Own-Position Estimation

Figure 3:
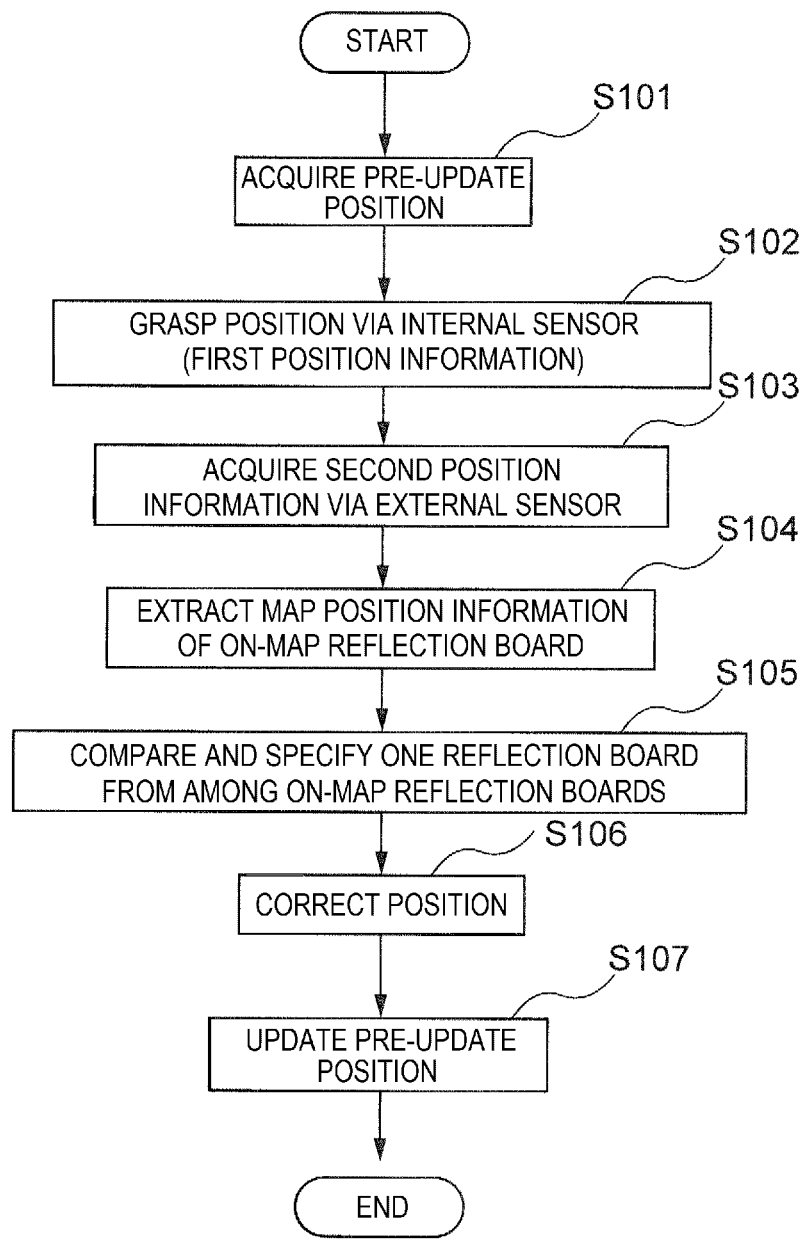
FIG. 3 is a flowchart explaining own-position correction of the automated guided vehicle according to Embodiment 1.

The way the own-position estimation of the automated guided vehicle is carried out will now be described with reference to FIGS. 3 and 4.

As preprocessing, data of the map of the inside of the building and the position of the on-map reflection board is stored into the RAM 16 of the control unit 8 from the storage device 20 such as a PC. This results in the state where data of the map 21 of the inside of the building and the position of the plurality of on-map reflection boards 22 has been registered in advance. Then, a person inputs information of the position and direction where the automated guided vehicle is placed, as a pre-update position that is an initial value at the start of traveling (step S101).

The automated guided vehicle 2 starts traveling from a predetermined position inside the building, that is, the position where the automated guided vehicle 2 is placed. After the travel starts, first position information of the automated guided vehicle 2 is acquired from the internal sensor 5. That is, the automated guided vehicle 2 moves, grasping its own position at the current time point during the travel, as the first position information (distance and direction) (first step: step S102).

Inside the building, the light cast from the external sensor (LRF) 7 of the automated guided vehicle 2 hits one of the plurality of reflection boards 6 arranged inside the building, and the external sensor 7 receives reflected light reflected off that reflection board 6. Thus, the time from the casting to the reception of the light is measured. Based on the measured time and the velocity of light, second position information (distance and direction) is acquired as the position information of the automated guided vehicle 2 in relation to the reflection board 6, and a reflection board whose estimated tilt is equal to or lower than a threshold is detected as the reflection board (second step: step S103). In most cases, the second position information with respect to the reflection board 6 actually detected by the external sensor 7 is slightly different from the registered position information (distance and direction) of the on-map reflection board 22 to which the reflection board 6 corresponds.

At the stage where the second position information is acquired, the position of the plurality of on-map reflection boards 22 inside the building registered in advance, that is, map position information (distance and direction), is extracted (third step: step S104). This extraction is carried out based on the first position information. Thus, the on-map reflection board 22 that is expected to be detected by the external sensor 7 of the automated guided vehicle 2 located at the position of the first position information is limited to a part of the plurality of on-map reflection boards 22. Therefore, this part of the on-map reflection boards 22 is extracted. Also, wrong recognition due to the influence of a noise from a glossy object inside the building other than the reflection board 6 can be reduced.

Subsequently, in step S105, the second position information of the automated guided vehicle 2 acquired in step S103 (second step) and the map position information of the on-map reflection board 22 extracted in step S104 (third step) are compared with each other. Then, which on-map reflection board 22 on the map 21 corresponds to the actually detected reflection board 6 is specified (comparison step).

In this comparison step, one or more of the plurality of on-map reflection boards 22 included in a first predetermined range 23 (illustration on the left-hand side in FIG. 4) from the center position of the reflection board 6 actually detected in step S103 (second step) are specified. Here, the "first predetermined range 23" is set, based on the installation space between reflection boards allowed by the limit margin of error and environment of each of the internal sensor 5 and the external sensor 7. The proper first predetermined range 23 is a range such that one of the reflection boards can be identified with certainty. In this embodiment, due to constraints on the installation environment, the first predetermined range 23 is set as a range surrounded by a circle with a radius of 3 m.

Figure 4:
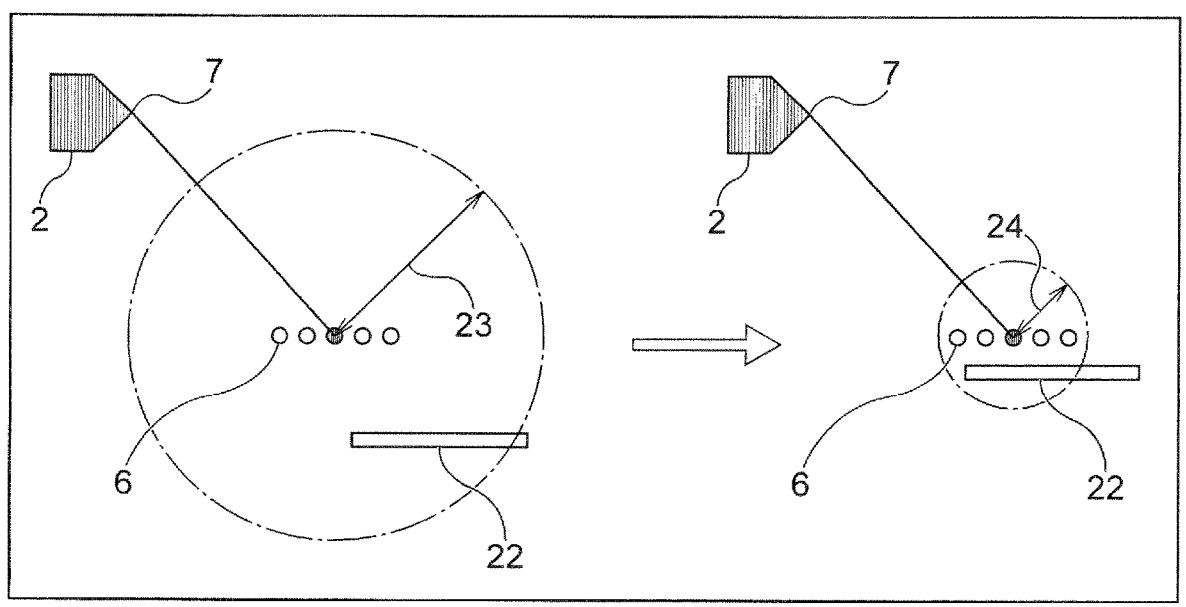
FIG. 4 explains detection and specification of a reflection board by an external sensor according to Embodiment 1.

The illustration on the left-hand side in FIG. 4 is equivalent to the state where the actual position of the automated guided vehicle 2 is more distant from the reflection board than a correct position where the automated guided vehicle 2 should be, on the map 21. This can be understood from that, in FIG. 4, the distance from the reflection board 6 detected by the external sensor 7 is longer than the distance from the on-map reflection board 22 corresponding to the reflection board 6. In this case, in a correction step, described later, position correction is made into a direction such that the automated guided vehicle 2 approaches the on-map reflection board 22.

In FIG. 4, when the distance from the reflection board 6 detected by the external sensor 7 is shorter than the distance from the on-map reflection board 22 corresponding to the reflection board 6, the positional relationship is the reverse of the above. In this case, the direction of correction is reversed.

In the embodiment of the present disclosure, as the internal sensor 5, a sensor having a smaller margin of error in the own position than the related art and having a high traveling acracy of less than ±1% with respect to 10-m travel of the automated guided vehicle 2 is employed, as described above. Thus, the "first predetermined range" can be easily set in such a way that, most of the time, one reflection board 6, and at most two reflection boards 6 are detected by the external sensor 7. Also, as large a space as possible can be provided between the neighboring reflection boards 6, of the plurality of reflection boards 6 arranged inside the building, so that the one reflection board 6 can be arranged in such a way as to be detected easily.

Subsequently, in step S106, based on the map position information (distance and direction) of the on-map reflection board 22 specified in step S105, the first position information acquired by the internal sensor 5 is corrected (correction step). Thus, the accumulated error in the own-position estimation by the internal sensor 5 can be corrected. This enables traveling based on highly accurate own-position estimation.

In step S107, the pre-update position acquired in step S101 is updated to the position information corrected in step S106, and the processing ends. Thus, the position of the automated guided vehicle 2 is updated into a direction such that the own-position estimation at the current time point becomes more precise.

According to the embodiment, the margin of error in the own position by the internal sensor 5 is less than ±1% with respect to 10-m travel of the automated guided vehicle 2. That is, according to the present disclosure, a high traveling accuracy of the AGV is achieved based on own-position correction via the internal sensor. Therefore, the control unit 8 can perform the own-position correction via the external sensor 7, using one reflection board.

Thus, the combination of the internal sensor 5 and the external sensor 7 according to the aspect enables sufficient own-position correction using one reflection board. It is also advantageous in that the correction need not be carried out frequently. Also, since one reflection board is sufficient, the load of arithmetic processing of the detection result is smaller and the number of reflection boards installed inside the building can be reduced. Thus, the cost of equipment installation can be restrained.

As described above, the problems occurring in the configuration where the own position is calculated using two or more reflection boards as in the related art can be reduced, and the automated guided vehicle system 1 where the automated guided vehicle 2 autonomously moves inside the building can be more easily put into practical use.

First Predetermined Range→Second Predetermined Range

As shown in FIG. 4, in this embodiment, after the correction step of step S106 is executed over the first predetermined range 23 and the automated guided vehicle 2 makes a course correction and then moves on, the first predetermined range 23 is changed into a second predetermined range 24 (illustration on the right-hand side in FIG. 4) smaller than the first predetermined range 23 and each step similar to the above is executed.

Here, the term "each step" refers to the first step, the second step, the third step, the comparison step, and the correction step.

According to the embodiment, when the correction step is executed over the first predetermined range 23 and the automated guided vehicle 2 makes a course change, it results in the state where the own-position accuracy is improved. Thus, the first predetermined range 23 can be changed into the second predetermined range 24 smaller than the first predetermined range 23.

Thus, when detecting the reflection board 6 in the second step and specifying, in the comparison step, one or more on-map reflection boards 22 corresponding to the reflection board 6 detected in the second step, the influence of a noise due to a glossy object around the reflection board 6 arranged inside the building can be restrained because the second predetermined range 24 is smaller than the first predetermined range 23.

Subsequently, the second predetermined range 24 may be changed into a third predetermined range (not illustrated) even smaller than the second predetermined range 24.

First Predetermined Range→Second Predetermined Range→First Predetermined Range

In the embodiment, when, in the comparison step of step S105, none of the plurality of on-map reflection boards 22 in the third step is included in the second predetermined range 24 from a center position 26 of the reflection board 6 in the second step, steps S106 and S107 are omitted and the processing is executed again from step S101 after the second predetermined range 24 is expanded. Here, the first predetermined range is employed as the upper limit and the second predetermined range 24 is expanded until the on-map reflection board 22 can be detected.

When, for example, an unexpected course deviation occurs after the automated guided vehicle 2 makes a course correction via the correction step executed over the first predetermined range 23, it can be the case that none of the plurality of on-map reflection boards 22 in the third step is included in the second predetermined range 24.

According to this embodiment, in such a case, the second predetermined range 24 is changed into the original first predetermined range 23. Therefore, the reflection board 6 corresponding to the on-map reflection board 22 can be detected more easily and the automated guided vehicle 2 can be more easily restored into the state of being able to perform own-position correction.

Specific Prescription of Second Predetermined Range

In this embodiment, in the second step, a plurality of distances (reference number 25 in FIG. 5) from the automated guided vehicle 2 to the reflection board 6 is acquired, and the second predetermined range 24 is a range calculated based on a standard deviation calculated from an estimation error model in the first step and the second step. The estimation error model refers to a distribution of the amount of margin of error in own-position estimation that can occur in the calculation of own-position estimation in the first step and the second step combined together.

According to this embodiment, the second predetermined range 24 is a range three times or more and six times and less than the standard deviation of the margin of error in own-position estimation that can be expected from the estimation error model. Therefore, sufficient own-position correction can be carried out using the on-map reflection board 22 corresponding to one reflection board 6. Also, the correction need not be carried out frequently and the automated guided vehicle 2 can continue moving for a long time in the own-position estimation state.

Reduction of Influence of Wrong Recognition Due to how Reflection Board Looks

Figure 5:
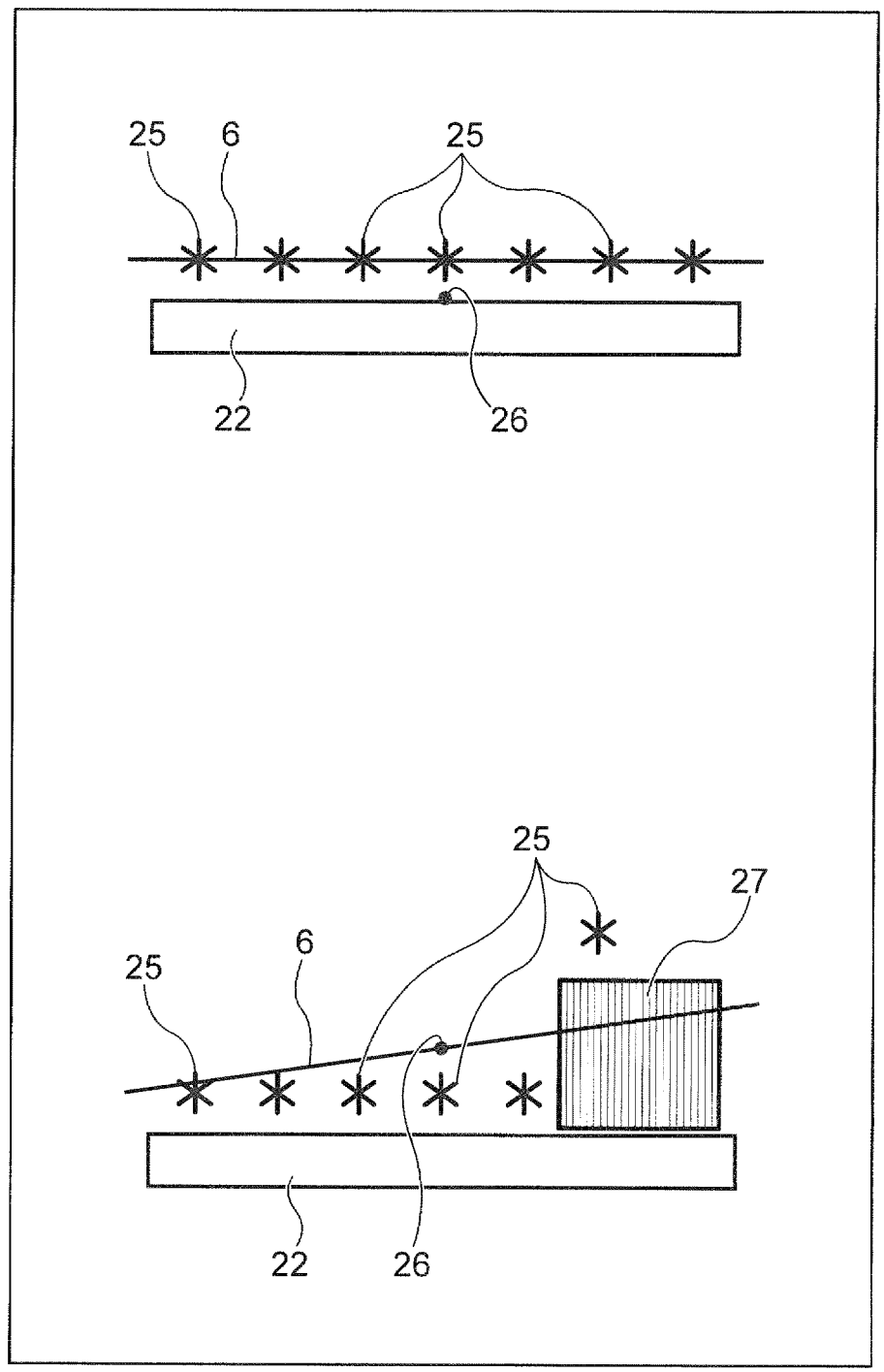
FIG. 5 explains the case where the external sensor correctly recognizes the position of the reflection board and the case where the external sensor wrongly recognizes the position of the reflection board, according to Embodiment 1.

FIG. 5 explains the case where the external sensor 7 correctly recognizes the position of the reflection board and the case where the external sensor 7 wrongly recognizes the position of the reflection board 6.

When the reflection board 6 is obstructed by a worker or an object 27 and only partly visible, the position of the reflection board 6 is wrongly recognized and the own-position estimation deviates. The illustration at the top in FIG. 5 shows the case where the entirety of the reflection board 6 is visible to the external sensor 7. The illustration at the bottom in FIG. 5 shows the case where a part of the reflection board 6 is obstructed and invisible to the external sensor 7.

The external sensor 7 measures the distance to the reflection board 6 at a plurality of sites 25. Specifically, the external sensor 7 acquires data of the distance at the plurality of sites 25 provided at a predetermined space from each other from one end to the other end of the reflection board 6. Then, linearization processing by the least squares method or the like is performed based on the data of the plurality of distances taken at the plurality of sites 25. Based on the resulting straight line, the center position 26 of the reflection board 6 is found. Then, the center position 26 is regarded as the position of the reflection board 6, and the distance to the reflection board 6 is found.

Figure 6:
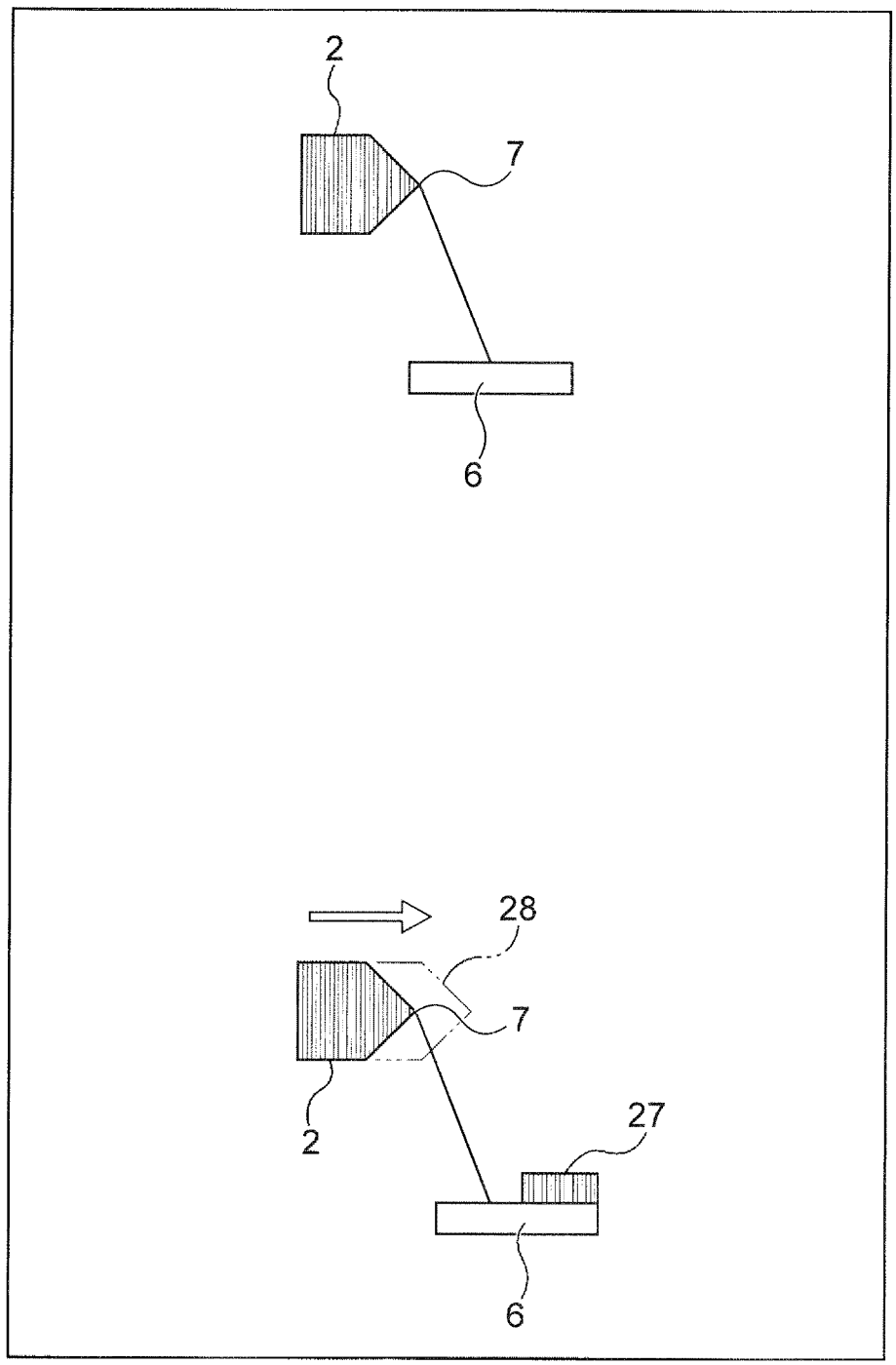
FIG. 6 explains correct own-position correction in the case where the position is correctly recognized as shown in FIG. 5 and wrong own-position correction in the case where the position is wrongly recognized as shown in FIG. 5.

FIG. 6 explains that, when the reflection board 6 is only partly visible, the position of the reflection board is wrongly recognized and the own-position estimation deviates.

The illustration at the top in FIG. 6 shows the case where the entirety of the reflection board 6 is visible to the external sensor 7 and where the problem of deviation in the own-position estimation does not occur. Meanwhile, the illustration at the bottom in FIG. 6 shows the case where a part of the reflection board 6 is obstructed and invisible to the external sensor 7 (corresponding to the illustration at the bottom in FIG. 5) and where the problem of deviation in the own-position estimation occurs. In the illustration at the bottom in FIG. 6, the reference number 28 schematically shows the state a deviation in the own-position estimation has occurred.

Figure 7:
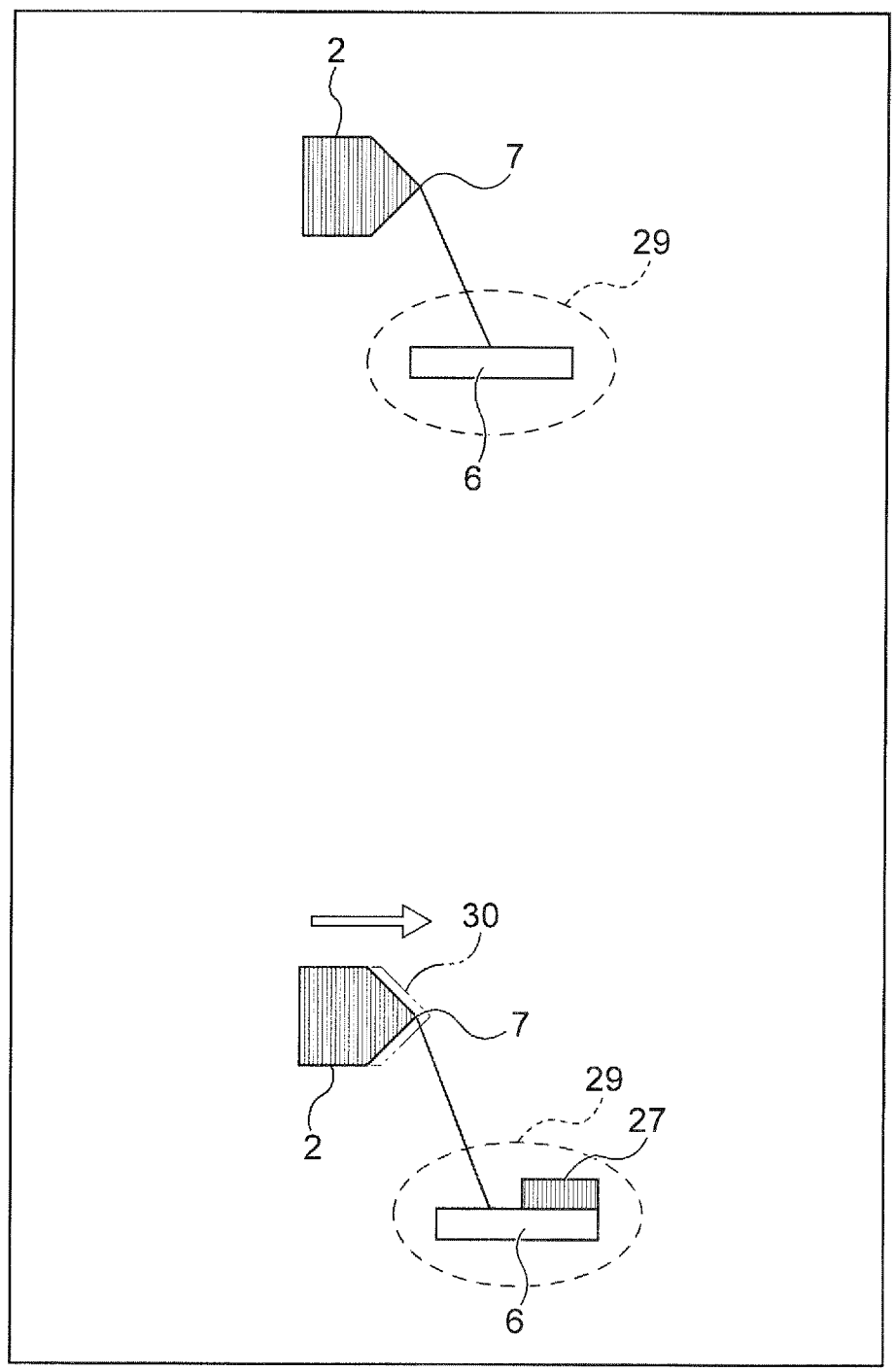
FIG. 7 explains the way the own-position correction to reduce the influence of the wrong recognition in FIG. 5 is carried out.

FIG. 7 explains the way the problem of deviation in the own-position estimation in the case where the reflection board 6 is only partly visible is reduced.

Of the plurality of reflection boards 6 arranged inside the building, some may be in the state shown at the top in FIG. 5 and some may be in the state shown at the bottom in FIG. 5, but this cannot be predicted. Thus, in this embodiment, when finding the position information (second position information) via the external sensor 7 in relation to all the reflection boards 6 arranged inside the building, processing is performed on the assumption that there is a uniform margin of error. That is, it is assumed that there is a uniform margin of error with respect to the reflection board in the state shown at the top in FIG. 5 and the reflection board in the state shown at the bottom in FIG. 5, and when finding the position information and deciding the amount of correction, processing to uniformly reduce the amount of correction is performed. In FIG. 7, the reference number 29 schematically shows that processing is performed on the assumption that there is a uniform margin of error. The reference number 30 schematically shows that the deviation in the own-position estimation can be reduced.

Division with Index

Figure 8:
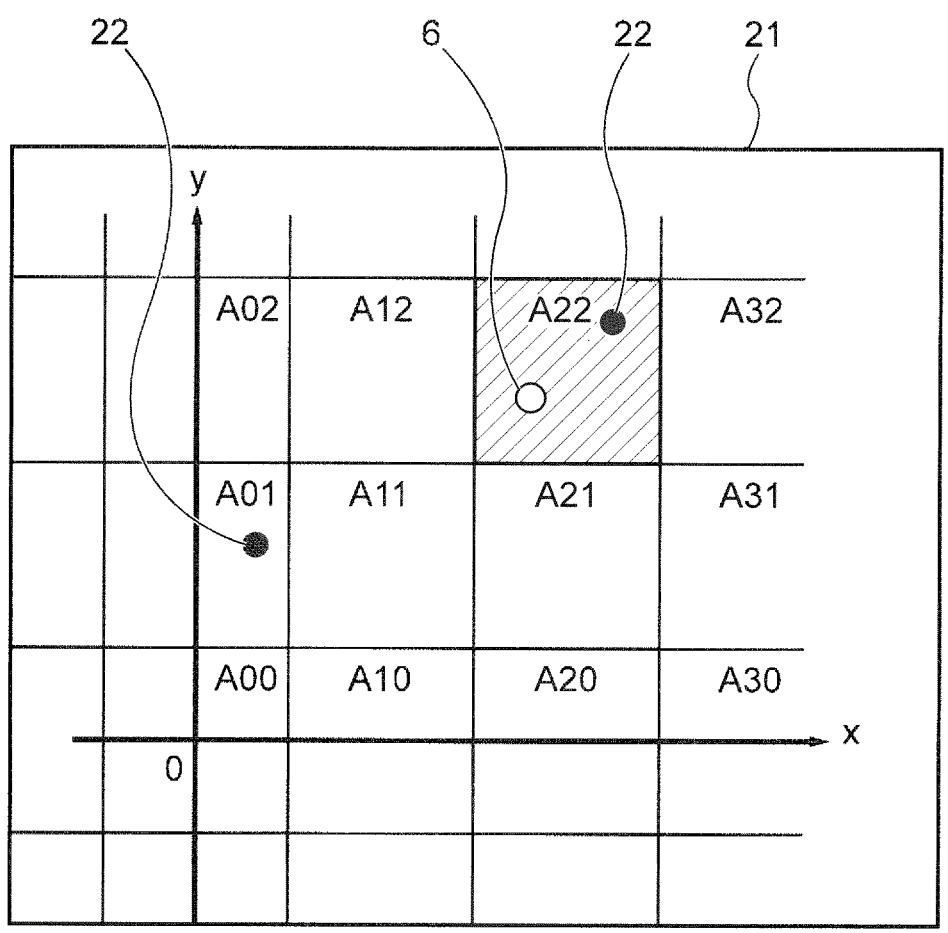
FIG. 8 explains the way the specifying processing time to specify one of reflection boards on a map based on detection information via the external sensor is reduced, according to Embodiment 1.

In this embodiment, as shown in FIG. 8, the registered map 21 is divided in a two-dimensional space with XY coordinates, into predetermined unit sections with an index Aij, where i is an integer equal to 0 and 1 or greater on the X-coordinate and j is an integer including 0 and equal to or greater than 1 on the Y-coordinate), and the on-map reflection board 22 registered on the map 21 is associated with the index Aij of the corresponding section. In the comparison step, the on-map reflection board 22 corresponding to the second position information of the reflection board 6 is specified, using the index Aij.

Here, the predetermined unit section (division size) is set in such a way that search processing to specify the on-map reflection board becomes easier, based on the position of the reflection board 6 actually arranged inside the building and the corresponding on-map reflection board 22, and the space between the neighboring ones.

In FIG. 8, the on-map reflection board 22 is located in each of sections with indices A01 and A22. The reflection board 6 detected by the external sensor 7 is located in the section with the index A22. Therefore, this reflection board 6 is determined as the on-map reflection board 22 located in the section with the index A22.

According to this embodiment, in the comparison step, the on-map reflection board 22 corresponding to the second position information of the reflection board 6 is specified, using the index Aij. Therefore, the time taken for the specifying can be reduced.

High-Speed Search without Failing to Detect Reflection Board Located in Gap Between Sections with Index This embodiment is also configured as follows. That is, in the specifying using the index Aij in the comparison step, when two or more on-map reflection boards 22 are detected within the first predetermined range 23 from the center position 26 of the reflection board 6 detected in the second step, the on-map reflection board 22 with the shortest distance from the reflection board 6 is determined as a reflection board corresponding to the reflection board.

Figure 9:
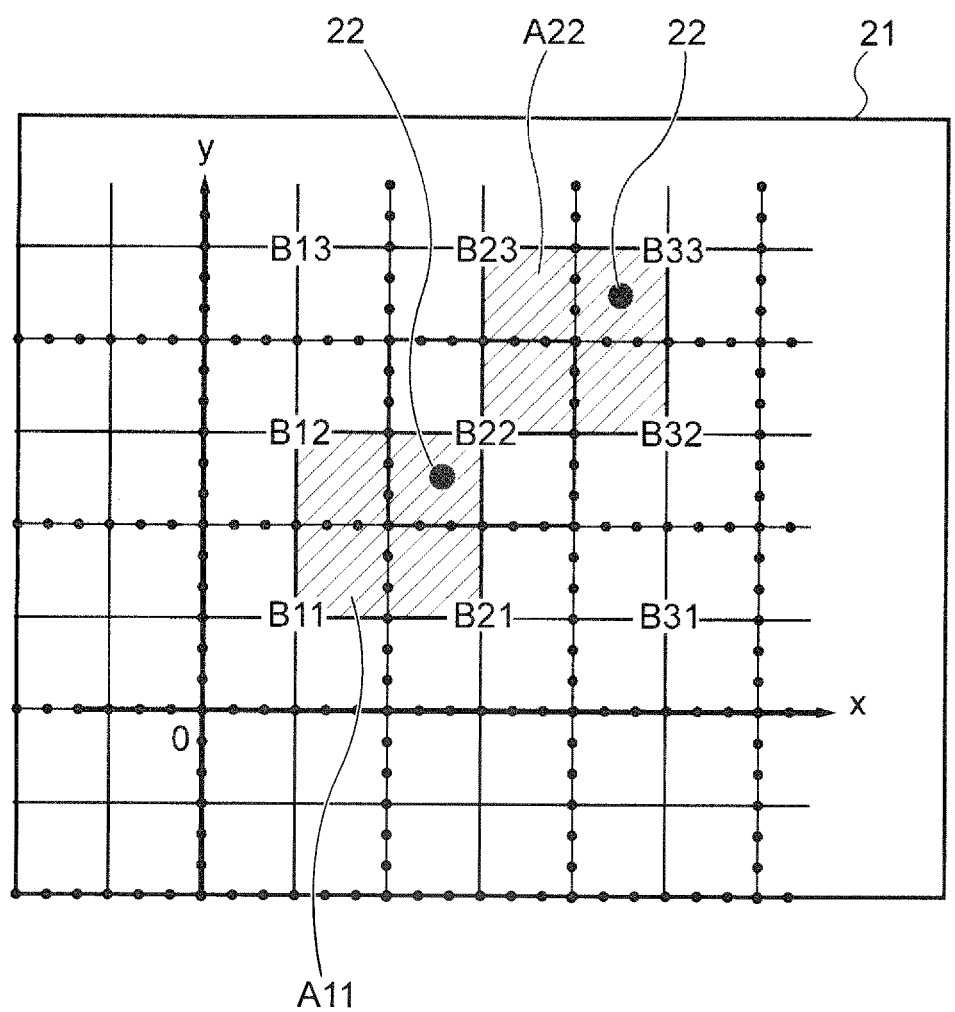
FIG. 9 explains the way the specifying processing time to specify one of reflection boards on a map based on detection information via the external sensor is reduced, according to Embodiment 1.

Specifically, as shown in FIG. 9, the map is divided into sections with the index Aij and also sections with a different index Bij, where i is an integer equal to or greater than 1 on the X-coordinate and j is an integer equal to or greater than 1 on the Y-coordinate). The index Bij is shifted from the index Aij by ½ along both the X-axis and the Y-axis. The index Bij stores information of the index Aij where the on-map reflection board 22 is arranged. In FIG. 9, lines with dots indicate sections with the index Bij and simple solid lines indicate sections with the index Aij.

When arranging the plurality of reflection boards 6, depending on the structure inside the building, there may be a case where a large space cannot be taken between the neighboring reflection boards 6 and where the reflection boards 6 must be arranged at a small space between them. As shown in FIG. 9, depending on the degree of the small space, the on-map reflection board 22 may be located in both the neighboring sections with the index A11 and the index A22, of the sections divided with the index Aij.

Figure 10:
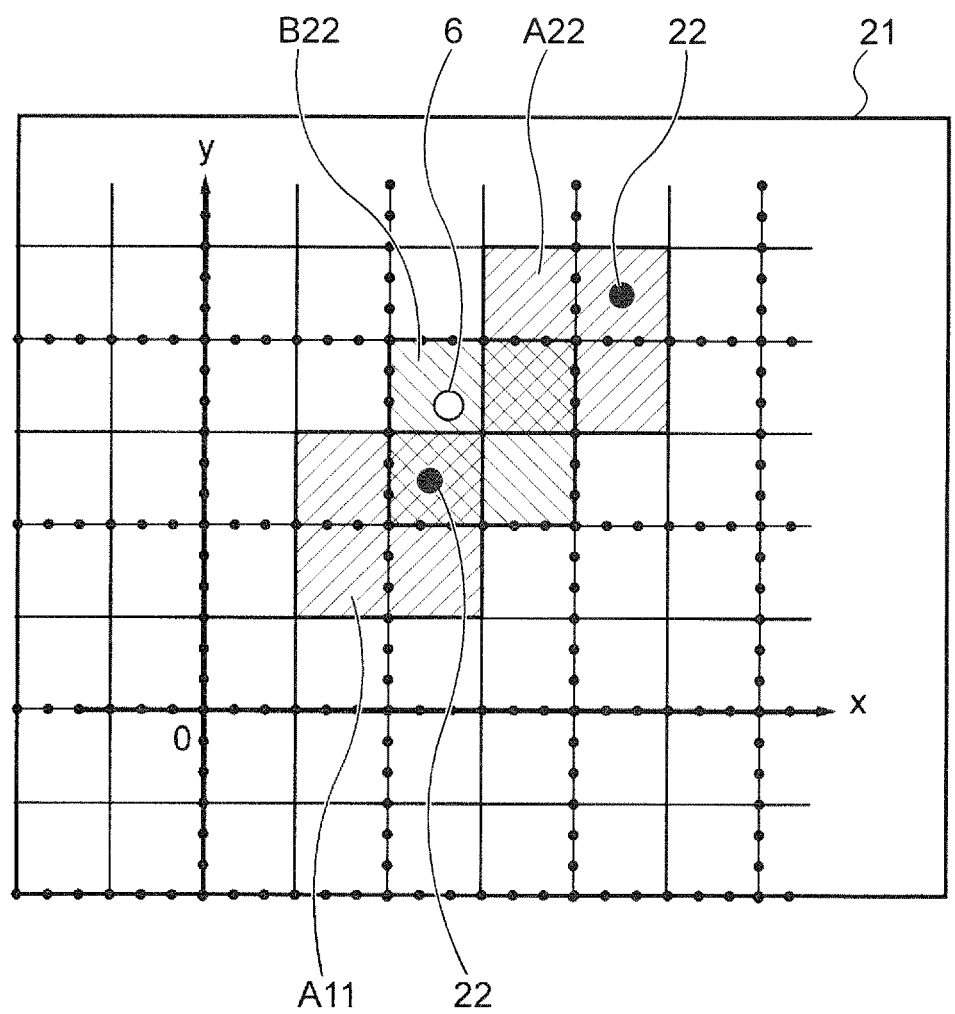
FIG. 10 explains the way the specifying processing time to specify one of reflection boards on a map based on detection information via the external sensor is reduced, according to Embodiment 1.

In FIG. 10, the reflection board 6 detected by the external sensor 7 is located outside the neighboring sections with the index A11 and the index A22 (located at the boundary between these sections). Therefore, when only the index Aij is used, it may be regarded that there is no corresponding on-map reflection board 22, and this may result in detection failure.

However, according to this embodiment, it can be understood that the reflection board 6 is located in a section with another index B22 located between the neighboring sections with the index A11 and the index A22. Thus, the distance between the reflection board 6 and each of the two on-map reflection boards 22 is computed, and the on-map reflection board 22 with the shorter distance can be determined as the corresponding on-map reflection board 22.

According to this embodiment, even when the reflection board 6 is arranged with a small space from another, one on-map reflection board 22 corresponding to the reflection board 6 can be easily specified.

Mainly performing the comparison processing using the index B enables higher-speed comparison processing than when using the index A alone.

OTHER EMBODIMENTS

The automated guided vehicle system and the own-position estimation method for the automated guided vehicle according to the present disclosure basically have the foregoing configurations. However, changes, omissions and the like of a part of the configurations can be made without departing from the spirit and scope of the present disclosure.

In the embodiment, the reflection board 6 has no recognition part. That is, the reflection board 6 has only the function of reflecting light and does not have a recognition part such as a marker representing its own information.

What is claimed is:

1. An own-position estimation method for an automated guided vehicle moving autonomously inside a building, the method comprising:
a first step of acquiring first position information of the automated guided vehicle from an internal sensor having an encoder and a gyro sensor;
a second step of casting light from the automated guided vehicle onto a reflection board arranged in the building and acquiring second position information of the automated guided vehicle in relation to the reflection board from an external sensor receiving reflected light from the reflection board;
a third step of extracting map position information of a plurality of on-map reflection boards on a map of an inside of the building that is registered in advance;
a comparison step of comparing the second position information of the automated guided vehicle acquired in the second step and the map position information of the on-map reflection boards extracted in the third step, and specifying the on-map reflection board corresponding to the reflection board; and
a correction step of correcting the first position information, using computed position information of the automated guided vehicle computed based on the on-map reflection board specified in the comparison step, wherein
in the comparison step, one or more of the plurality of on-map reflection boards in the third step, included in a first predetermined range from a center position of the reflection board in the second step, are specified, after the correction step is executed over the first predetermined range and the automated guided vehicle makes a course correction and moves on, the first predetermined range is changed into a second predetermined range smaller than the first predetermined range, and
each of the steps is executed.

2. The own-position estimation method for the automated guided vehicle according to claim 1, wherein
the first step includes acquiring the first position information of the automated guided vehicle from an internal sensor having a margin of error in the own position of less than ±1% with respect to 10-m travel.

3. The own-position estimation method for the automated guided vehicle according to claim 1, wherein
in the comparison step, when none of the plurality of on-map reflection boards in the third step is included in a second predetermined range from the center position of the reflection board in the second step, the second predetermined range is changed into the first predetermined range.

4. The own-position estimation method for the automated guided vehicle according to claim 1, wherein
the first predetermined range is within a measurement limit distance of the external sensor from the center position of the reflection board in the second step.

5. The own-position estimation method for the automated guided vehicle according to claim 1, wherein
the second predetermined range is a range calculated based on a standard deviation calculated from an estimation error model in the first step and the second step.

6. The own-position estimation method for the automated guided vehicle according to claim 5, wherein
the second predetermined range is a range three times or more and six times and less than a standard deviation of a margin of error in own-position estimation that can be expected from the estimation error model.

7. The own-position estimation method for the automated guided vehicle according to claim 1, wherein
the reflection board has no recognition part.

8. An own-position estimation method for an automated guided vehicle moving autonomously inside a building, the method comprising:
a first step of acquiring first position information of the automated guided vehicle from an internal sensor having an encoder and a gyro sensor;
a second step of casting light from the automated guided vehicle onto a reflection board arranged in the building and acquiring second position information of the automated guided vehicle in relation to the reflection board from an external sensor receiving reflected light from the reflection board;
a third step of extracting map position information of a plurality of on-map reflection boards on a map of an inside of the building that is registered in advance;
a comparison step of comparing the second position information of the automated guided vehicle acquired in the second step and the map position information of the on-map reflection boards extracted in the third step, and specifying the on-map reflection board corresponding to the reflection board; and
a correction step of correcting the first position information, using computed position information of the automated guided vehicle computed based on the on-map reflection board specified in the comparison step, wherein in the comparison step, one or more of the plurality of on-map reflection boards in the third step, included in a first predetermined range from a center position of the reflection board in the second step, are specified, the map is divided into predetermined unit sections with an index, the on-map reflection board registered on the map is associated with the index, and the comparison step includes specifying the on-map reflection board corresponding to the second position information of the reflection board, using the index.

9. The own-position estimation method for the automated guided vehicle according to claim 8, wherein in the comparison step, when two or more on-map reflection boards are detected within the first predetermined range from the center position of the reflection board in the second step, an on-map reflection board with a shortest distance from the reflection board is determined as a reflection board corresponding to the reflection board.

10. An own-position estimation method for an automated guided vehicle moving autonomously inside a building, the method comprising:

a first step of acquiring first position information of the automated guided vehicle from an internal sensor having an encoder and a gyro sensor;

a second step of casting light from the automated guided vehicle onto a refection board arranged in the building and acquiring second position information of the automated guided vehicle in relation to the reflection board from an external sensor receiving reflected light from the reflection board;

a third step of extracting map position information of a plurality of on-map reflection boards on a map of an inside of the building that is registered in advance;

a comparison step of comparing the second position information of the automated guided vehicle acquired in the second step and the map position information of the on-map reflection boards extracted in the third step, and specifying the on-map reflection board corresponding to the reflection board; and a correction step of correcting the first position information, using computed position information of the automated guided vehicle computed based on the on-map reflection board specified in the comparison step, wherein in the comparison step, one or more of the plurality of on-map reflection boards in the third step, included in a first predetermined range from a center position of the refection board in the second step, are specified, and the second step includes tilt information of the reflection board and includes deciding whether or not to use position information of the reflection board estimated based on the tilt information of the reflection board, for calculation of own-position estimation.

\* \* \* \* \*